US012669179B2

(12) United States Patent
Elliott

(10) Patent No.: US 12,669,179 B2
(45) Date of Patent: Jun. 30, 2026

(54) ADJUSTABLE BI-DIRECTIONAL THROTTLING CHOKE VALVE

(71) Applicant: Cameron International Corporation, Houston, TX (US)

(72) Inventor: Declan Elliott, Longford (IE)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 19/105,080

(22) PCT Filed: Dec. 1, 2023

(86) PCT No.: PCT/US2023/081992
§ 371 (c)(1),
(2) Date: Feb. 20, 2025

(87) PCT Pub. No.: WO2024/119019
PCT Pub. Date: Jun. 6, 2024

(65) Prior Publication Data
US 2026/0104095 A1      Apr. 16, 2026

Related U.S. Application Data

(60) Provisional application No. 63/385,804, filed on Dec. 2, 2022.

(51) Int. Cl.
*F16K 3/02* (2006.01)
*F16K 3/314* (2006.01)
*F16K 47/04* (2006.01)

(52) U.S. Cl.
CPC ............ *F16K 3/0209* (2013.01); *F16K 3/314* (2013.01); *F16K 47/04* (2013.01)

(58) Field of Classification Search
CPC ......... F16K 3/0209; F16K 3/314; F16K 47/04
See application file for complete search history.

(56) References Cited

U.S. PATENT DOCUMENTS

| | | | |
|---|---|---|---|
| 4,446,887 A | 5/1984 | Redmon | |
| 6,425,534 B2 * | 7/2002 | Ketcham | ............... B05B 7/2472 |
| | | | 137/893 |
| 8,523,141 B2 | 9/2013 | Elliott | |
| 9,145,981 B2 | 9/2015 | Elliott | |
| 9,482,347 B2 | 11/2016 | Elliott | |
| 11,815,191 B2 | 11/2023 | Elliott | |
| 12,276,356 B2 | 4/2025 | Elliott | |

(Continued)

FOREIGN PATENT DOCUMENTS

| | | |
|---|---|---|
| CN | 203532817 U | 4/2014 |
| CN | 213744991 U | 7/2021 |

*Primary Examiner* — Patrick C Williams
(74) *Attorney, Agent, or Firm* — Kyle R. Miiller

(57) ABSTRACT

A choke gate valve includes a housing that defines a fluid bore and a gate with multiple throttling orifices. The gate is configured to move within the housing between a first throttle position in which the gate extends across the fluid bore to position a first throttling orifice of the multiple throttling orifices in the fluid bore to throttle a fluid flow through the fluid bore and a second throttle position in which the gate extends across the fluid bore to position a second throttling orifice of the multiple throttling orifices in the fluid bore to throttle the fluid flow through the fluid bore.

18 Claims, 3 Drawing Sheets

(56) References Cited

U.S. PATENT DOCUMENTS

| | | | | |
|---|---|---|---|---|
| 2005/0173009 | A1* | 8/2005 | Bowe | F16K 3/24 |
| | | | | 137/808 |
| 2012/0319025 | A1* | 12/2012 | Shu | F16K 3/0209 |
| | | | | 251/328 |
| 2016/0108699 | A1 | 4/2016 | Martino | |
| 2017/0130846 | A1 | 5/2017 | Elliott | |

\* cited by examiner

ADJUSTABLE BI-DIRECTIONAL THROTTLING CHOKE VALVE

CROSS-REFERENCE TO RELATED APPLICATION

This application is a National Stage Entry of International Application No. PCT/US2023/081992, filed Dec. 1, 2023, which claims priority to and the benefit of U.S. Provisional Application Ser. No. 63/385,804, entitled "ADJUSTABLE BI-DIRECTIONAL THROTTLING CHOKE VALVE" and filed Dec. 2, 2022, the disclosure of which is incorporated herein by reference in its entirety for all purposes.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

The present disclosure relates to a flow control system, and more particularly, the present disclosure relates to adjustable choke gate valve systems.

In fluid handling systems, a flow of a fluid may be controlled by a valve. The fluid handling systems may be employed in any variety of applications and industries, such as oil and gas systems, storage facilities, manufacturing facilities, refineries, water treatment facilities, industrial plants, and the like. For example, in the oil and natural gas systems, the flow of fluid (e.g., gas, water, and oil) through pipes, wells, pumps, vessels, and refineries may be controlled by the valve. The valve may include an open position that enables the flow of fluid and a closed position that reduces or completely shuts-off the flow of fluid. The valve may be employed to limit (e.g., throttle) a pressure of the fluid and a flow rate of the fluid through the valve. For example, the valve may be partially closed to partially obstruct the flow of fluid, or may include an occlusion that obstructs the flow of fluid. Throttling is particularly useful where the flow of fluid occurs at a high pressure and/or a high flow rate, and where it is desirable to reduce the pressure and/or the flow rate. Throttling may be particularly well suited to direct the flow of fluid from oil and gas wells.

Two exemplary types of valves include gate valves and control valves (e.g., choke valves). A gate valve may include a housing, a moveable gate, and static seat rings that seal against the movable gate. The movable gate may include two opposing faces that contact the static seat rings, and the moveable gate may include a flow bore extending between the two opposing faces. The flow bore is slid into alignment with the static seat rings to enable a flow of fluid through the gate valve, and the flow bore is slid out of alignment with the static seat rings to shut off the flow of fluid through the gate valve. As the movable gate moves from a sealed or closed position to an unsealed or open position, it slides along a generally straight line between the static seat rings, which are typically affixed to the housing.

A control valve may include a housing that defines an annular cylinder or bore, as well as a solid cylinder (e.g., a "plug" or "stem") disposed within the annular cylinder or bore. The control valve restricts a flow of fluid based on a position of the solid cylinder relative to the annular cylinder or bore. One advantage of the control valve is its ability to partially occlude the flow of fluid with linear variations in the flow rate. However, the solid cylinder may be subject to high pressure drop environments, abrasive media entrained in fluid, and/or cavitation, which may lead to wear, erosion, and other degradation of components of the control valve.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a choke gate valve includes a housing that defines a fluid bore and a gate with multiple throttling orifices. The gate is configured to move within the housing between a first throttle position in which the gate extends across the fluid bore to position a first throttling orifice of the multiple throttling orifices in the fluid bore to throttle a fluid flow through the fluid bore and a second throttle position in which the gate extends across the fluid bore to position a second throttling orifice of the multiple throttling orifices in the fluid bore to throttle the fluid flow through the fluid bore.

In certain embodiments, a choke gate valve system includes a housing that defines a fluid bore, a gate that includes multiple throttling orifices, and an actuator configured to drive the gate to move within the housing to selectively align one or more throttling orifices of the plurality of throttling orifices with the fluid bore.

In certain embodiments, a method of operating a choke gate valve includes adjusting a gate within a housing to a first throttle position to align a first throttling orifice of the gate with a fluid bore to throttle a fluid flow through the fluid bore. The method further includes adjusting the gate within the housing to a second throttle to align a second throttling orifice of the gate with the fluid bore to throttle the fluid flow through the fluid bore.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
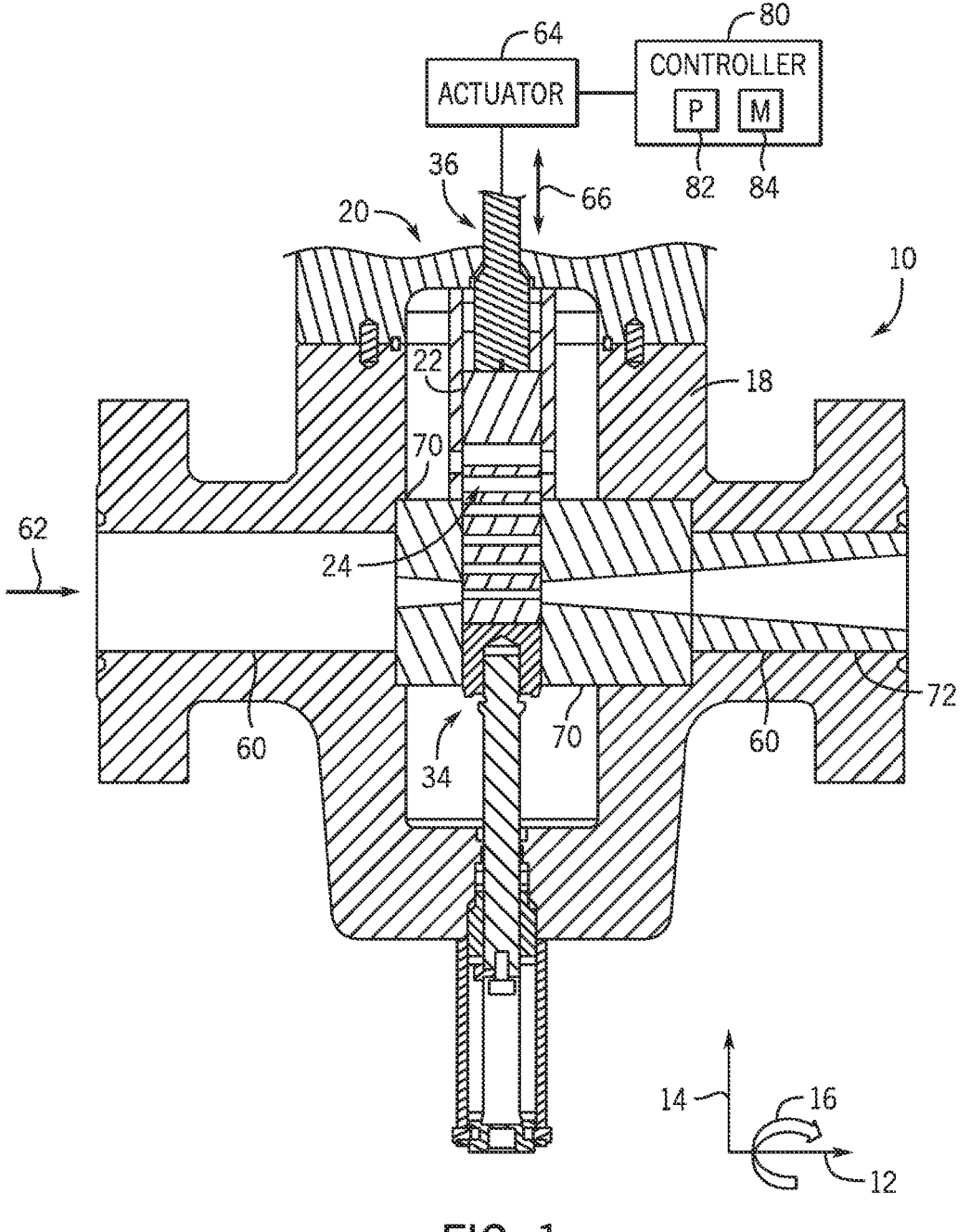
FIG. 1 is a side cross-sectional view of a choke gate valve, in accordance with an embodiment of the present disclosure.

One or more specific embodiments of the present disclosure will be described below. The particulars shown herein are by way of example, and for purposes of illustrative discussion of the embodiments of the subject disclosure only, and are presented in the course of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice.

Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure. Any examples of operating parameters and/or environmental conditions are not exclusive of other parameters/conditions of the disclosed embodiments.

When introducing elements of various embodiments of the present disclosure, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components. The term "fluid" encompasses liquids, gases, vapors, and combinations thereof. Certain terms are used throughout the description and claims to refer to particular features or components. As one skilled in the art will appreciate, different persons may refer to the same feature or component by different names. This document does not intend to distinguish between components or features that differ in name, but not function.

The present disclosure relates generally to a gate valve with choke functionalities, referred to herein as "a choke gate valve." In some embodiments, the choke gate valve may be a slab gate valve with a restricted bore for choking (e.g., throttling) a flow of fluid. The restricted bore may be achieved via a gate with multiple openings (e.g., positive beans, orifices, apertures). The multiple openings may be discrete openings and may have different sizes (e.g., diameters or dimensions) for use during different flow conditions and/or requirements (e.g., production requirements). Together, the multiple openings may provide selectable, adjustable control of the flow of fluid through the choke gate valve. Further, each opening of the multiple openings (e.g., when selected and in use for throttling the flow of fluid) provides a fixed and repeatable level of control of the flow of fluid through the choke gate valve (e.g., as opposed to a variable level of control and flow that occurs with typical choke valves that have variable apertures, such as a needle and seat choke trim). Accordingly, via actuation and movement of the gate with the multiple openings, the choke gate valve can provide multiple configuration options, such as a first throttling level or restricted bore size, a second throttling level or restricted bore size, and so on.

By including the gate with the multiple openings, the choke gate valve increases its wear resistance over typical choke valves that have variable apertures (e.g., as in a needle and seat choke trim). For example, variable apertures may increase in size due to erosion around inlets and outlets of the variable apertures, and thus, the increase in the size of the variable apertures may affect the flow of the fluid through the typical choke valves. However, the gate with the multiple openings resists increases in size of the multiple openings because the flow of the fluid would need to erode entire internal surfaces of the multiple openings in order to increase the size of the multiple openings and to change the flow of the fluid through the choke gate valve.

Accordingly, by including the gate with the multiple openings that are selectively aligned with the flow of fluid through the choke gate valve, the choke gate valve may provide increased wear resistance, and thus, may provide an operator with reliable control over the flow of the fluid through the choke gate valve for a longer period of time as compared to typical choke valves with variable apertures. It should be appreciated that the choke gate valve may be used in a drilling and/or production system (e.g., drilling system, production system, processing system, hydraulic fracturing system), as well as in any other type of system. Accordingly, the choke gate valve described herein may therefore reduce a number of well shut-ins with their associated costs (e.g., spares, lost production during shut-in, risk to reservoir on shut-in, loss of estimated ultimate recovery (EUR)).

In a dual flow path setup, the flow of fluid can be diverted to either of two separate flow paths with isolation valves and typical choke valves on each flow path so that an eroded typical choke valve along one flow path can be repaired while the flow of fluid continues to flow through the other flow path. In highly erosive environments with very high pressure drops, two or more typical choke valves may be placed in series to throttle to pressure in stages, thus reducing the erosion on individual typical choke valves. Advantageously, the gate with the multiple openings may enable use of a single choke gate valve (e.g., a single pressure drop device) on high pressure wells and/or erosive wells without a dual flow path setup or a number of valves in series setup. However, it should be appreciated that the choke gate valve having the gate with the multiple openings may be used in a dual flow path setup and/or with a number of valves in series setup. For example, in highly erosive environments with very high pressure drops, two or more valves may be placed in series (e.g., one or more variable aperture choke valves, one or more choke gate valves, or a combination of both) to throttle to pressure in stages, thus reducing the erosion on individual valves.

The gate with the multiple openings may also reduce fluid disturbance (e.g., jet impingement, swirling fluid flow), which may block and/or reduce pulverizing of sand and other particulates and/or erosion of conduit walls downstream of the choke gate valve. In some situations, less pulverization of sand and other particulates may facilitate separation of the sand and particulates from the flow of fluid. Less fluid disturbance may also reduce mixing of multiphase fluids, which may facilitate separation of the different fluids (e.g., hydrocarbons from water). The term "opening" should be understood to mean an aperture (e.g., through hole) of fixed area (e.g., cross-sectional area) that extends through a gate (e.g., elongated structure) that is moved within a housing to control the flow of fluid through the housing. The opening may have a dimension (e.g., diameter) between 1.25 to 16 centimeters (cm) (e.g., 0.5-6.5 inches (in)). The opening may be a generally round hole, but other shapes may also be used (e.g., semi-circle shape, oval shape, tear-drop shape, triangle shape, irregular shape, square shape, crescent shape).

Figure 2:
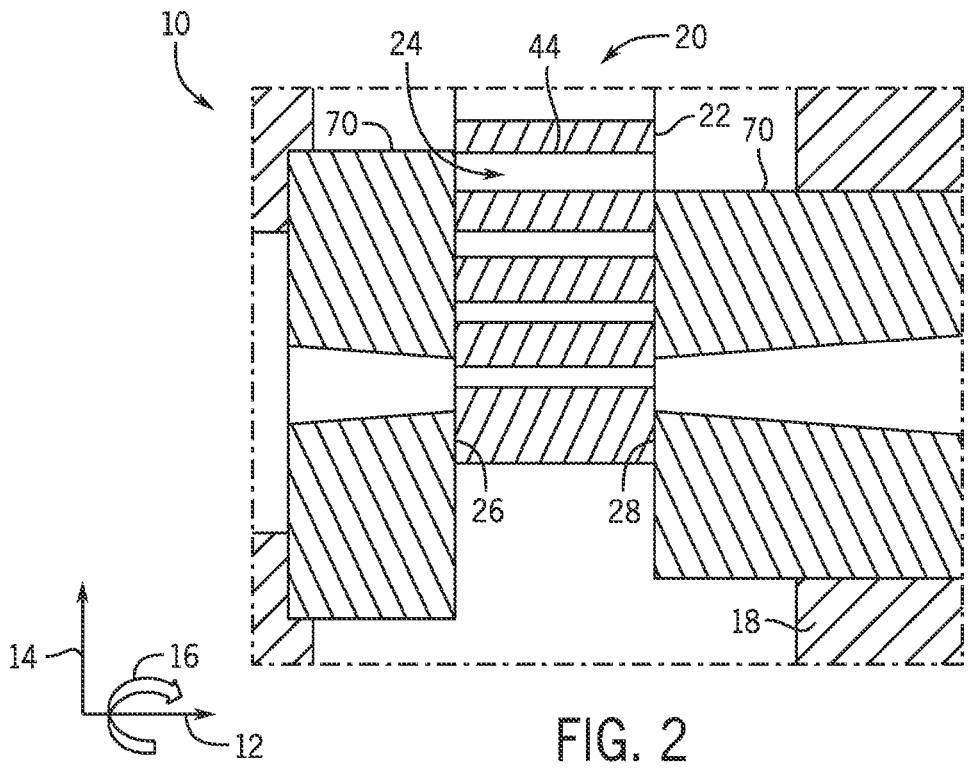
FIG. 2 is a side cross-sectional view of a portion of the choke gate valve of FIG. 1, wherein a gate is in a first position, in accordance with an embodiment of the present disclosure.
Figure 3:
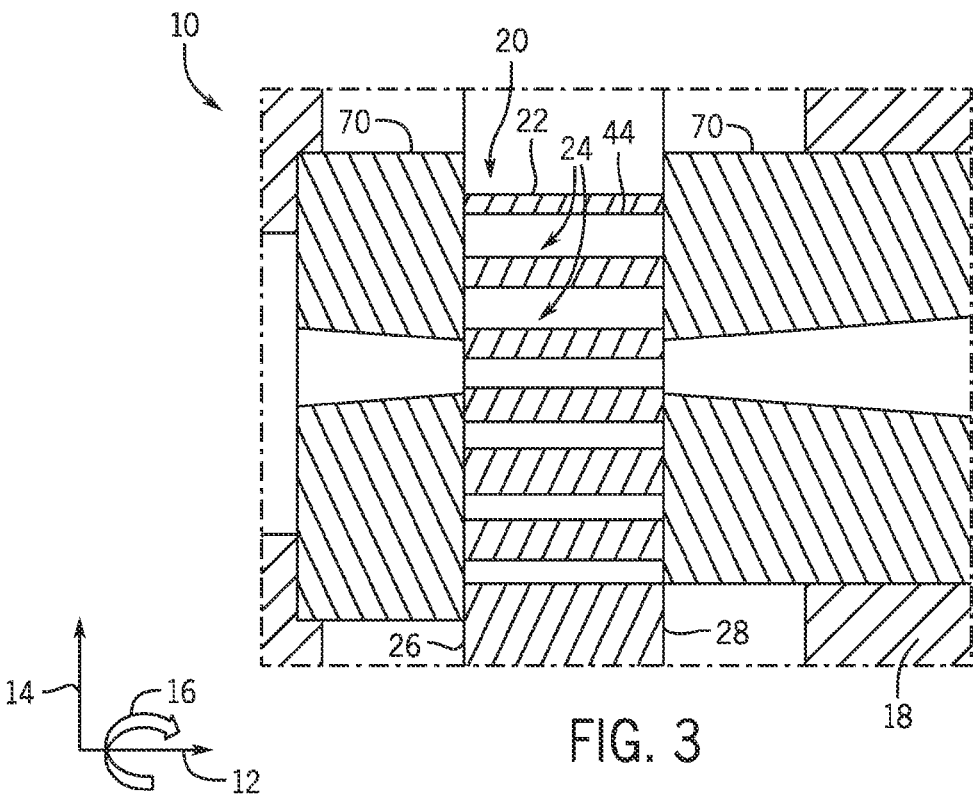
FIG. 3 is a side cross-sectional view of the portion of the choke gate valve of FIG. 2, wherein the gate is in a second position, in accordance with an embodiment of the present disclosure.

With the foregoing in mind, FIG. 1 is a side cross-sectional view of a choke gate valve 10, in accordance with an embodiment of the present disclosure. FIGS. 2 and 3 are side cross-sectional views of a portion of the choke gate valve 10, in accordance with an embodiment of the present disclosure. To facilitate discussion, the choke gate valve 10 may be described with reference to an axial axis or direction 12, a radial axis or direction 14, and a circumferential axis or direction 16. As shown, the choke gate valve 10 includes a housing 18 and a gate 20 (e.g., gate assembly) positioned in the housing 18.

The gate 20 includes a gate body 22 that defines multiple openings 24 (e.g., orifices). The multiple openings 24 extend axially from a first face 26 (e.g., front face) to a second face 28 (e.g., rear face) of the gate body 22. As shown, the multiple openings 24 may vary in size (e.g., inner diameter; cross-sectional area taken in a plane perpendicular to the axial axis 12). For example, a first opening 24 proximate to a first end 34 of the gate body 22 may have a first size, and a second opening 24 proximate to a second end 36 of the gate body 22 may have a second size that is different (e.g., greater) than the first size.

The multiple openings 24 may include an array of discrete openings with any suitable arrangement or configuration. In some embodiments, the multiple openings 24 may be arranged in a line across the gate body 22 (e.g., centered on the gate body 22; in the line along the vertical axis 14). The multiple openings 24 may be spaced apart from one another (e.g., separated from one another along the vertical axis 14). However, in some embodiments, the multiple openings 24 may overlap along the vertical axis 14 and/or may be spaced closely together along the gate body 22 so that at least a portion of at least one opening 24 of the multiple openings 24 is exposed to enable the flow of the fluid across the choke gate valve 10 during transition from one opening 24 to another opening 24 (e.g., the flow of fluid does not shut off during the transition).

In some embodiments, the multiple openings 24 may incrementally increase in size from the first end 34 of the gate body 22 to the second end 36 of the gate body 22. Alternatively, the multiple openings 24 may incrementally decrease in size from the first end 34 of the gate body 22 to the second end 36 of the gate body 22. In some embodiments, each of the multiple openings 24 may be a unique or different size (no two openings have a same size). Alternatively, each of the multiple openings 24 may be the same size, or some of the multiple openings may be the same size. Thus, if one of the multiple openings 24 that has a desirable size for throttling the flow of fluid (e.g., to provide a target production rate) experiences wear after a long duration of use for throttling the flow of fluid (e.g., over months or years), the gate 20 may be adjusted to utilize one of the other multiple openings 24 of the desirable size for throttling the flow of fluid. Accordingly, in such cases, the choke gate valve 10 may continue to be used with the one of the other multiple openings 24 of the desirable size for throttling the flow of fluid without performing maintenance operations to replace the gate 20.

As discussed herein, the multiple openings 24 may have different shapes or a same shape (e.g., cross-sectional shape taken in a plane perpendicular to the axial axis 12; circle shape, semi-circle shape, oval shape, tear-drop shape, triangle shape, irregular shape, square shape, crescent shape). Further, the multiple openings 24 may have any suitable shape that provide desirable and/or different flow characteristics (e.g., curves). Further, the gate 20 may include any number of multiple openings 24, such as 2, 3, 4, 5, 6, 7, 8, or more. Further, while present embodiments focus on the multiple openings 24, it should be appreciated that the gate 20 may be designed to include only a single opening. It should be appreciated that the gate 20 may be designed for certain conditions. For example, the gate 20 may include the multiple openings 24 of relatively small sizes to provide control in low valve flow coefficient (Cv) situations, where relatively large sizes and/or typical choke valves may not operate effectively (e.g., the typical choke valves may be severely pinched down). Additionally, sets or kits of gates 20 may be manufactured and utilized in operation. For example, one gate 20 may include the relatively small sizes, and another gate 20 may include the relatively large sizes. Indeed, any of a variety of gates 20 may be manufactured for selection based on desired throttling/operation.

In some embodiments, inner annular walls of the multiple openings 24 may be formed from or be lined with a liner 44 (e.g., tungsten carbide; ceramic; diamond) to provide wear-resistant surfaces along the multiple openings 24. Various alloys may be combined with tungsten carbide to produce materials of various hardness/erosion resistance. Further, the liner 44 may include a superhard material (e.g., a diamond-based material, polycrystalline cubic boron nitride, a material with a hardness value exceeding approximately (e.g., within 1-10 percent) 20 gigaPascals (GPa) based on the Vickers hardness test, and/or a material with a hardness value exceeding approximately (e.g., within 1-10 percent) 4500 Hardness Brinell (HB) on the Brinell scale).

In some embodiments, the multiple openings 24 are through holes formed in the gate body 22, such that the gate body 22 defines the multiple openings 24 (e.g., the multiple openings 24 defined by the gate body 22 directly contact the flow of fluid to throttle the flow of fluid without any additional inserts or structures). For example, the multiple openings 24 may be machined through holes formed in the gate body 22 or incorporated into the gate body 22 during three-dimensional (3D) printing of the gate body 22. However, it should be appreciated that removable inserts (e.g., annular inserts) may be coupled to through holes formed in the gate body 22 via any suitable interface (e.g., interference fit, mechanical fit, welding, fasteners, and/or threads), such that the removable inserts define the multiple openings 24 (e.g., the multiple openings 24 defined by the removable inserts directly contact the flow of fluid to throttle the flow of fluid). In such cases, the removable inserts may be coupled to the gate body 22 in a manner that enables efficient separation and/or installation so that an operator can swap one removable insert for another removable insert to change the arrangement or configuration of the multiple openings 24

(e.g., in response to a change in the conditions). Indeed, the gate body 22 and/or other components may be designed for efficient separation and/or installation so that the operator can swap one gate body 22 for another gate body 22 (e.g., with a different arrangement of the multiple openings 24) and/or so that the operator can convert the choke gate valve 10 into a typical gate valve (e.g., another gate body 22 with a single opening that enables a full level of the flow of fluid).

In operation, the choke gate valve 10 may essentially operate as a gate valve with choke functionality to throttle fluid flow. In particular, the housing 18 defines a fluid bore 60 that receives the flow of fluid, as indicated by arrow 62. An actuator 64 is configured to drive the gate 20 to move within the housing 18, as indicated by arrow 66 (e.g., transverse to the fluid bore 60). The actuator 64 may be controlled hydraulically, pneumatically, or electrically, and thus, the choke gate valve 10 may be considered to be actuated via hydraulic, pneumatic, or electric control. Accordingly, the actuator 64 drives the gate 20 to move to different positions (e.g., throttle positions or configurations; relative to the housing 18) in which at least one of the multiple openings 24 is aligned with the fluid bore 60 to throttle the flow of fluid across the choke gate valve 10.

For example, the actuator 64 may drive the gate 20 to move to a first throttling position in which the first opening 24 with the first size (e.g., smaller size) is aligned with the fluid bore 60 to throttle the flow of fluid during a first portion of a production operation (e.g., when the flow of fluid entering the choke gate valve 10 is at a first, higher pressure), and the actuator 64 may drive the gate 20 to move to a second throttling position in which the second opening 24 with the second size (e.g., greater size) is aligned with the fluid bore 60 to throttle the flow of fluid during a second portion of the production operation (e.g., when the flow of fluid entering the choke gate valve 10 is at a second, lower pressure; for sustained flow that provides the target production rate). Further, the actuator 64 may drive the gate 20 to move to a third throttling position in which a third opening 24 with a third size is aligned with the fluid bore 60 to throttle the flow of fluid during a third portion of the production operation, the actuator 64 may drive the gate 20 to move to a fourth throttling position in which a fourth opening 24 with a fourth size is aligned with the fluid bore 60 to throttle the flow of fluid during a fourth portion of the production operation, and so on depending on the conditions and/or desired throttling effects. To facilitate discussion, FIG. 2 illustrates the gate 20 in the first throttling position, while FIG. 3 illustrates the gate 20 in the fourth throttling position.

It should be appreciated that the actuator 64 may drive the gate 20 to any suitable throttling position that fully or partially uncovers (e.g., exposes to the fluid bore 60) at least one of the multiple openings 24 to enable the at least one of the multiple openings 24 to throttle the flow of fluid across the choke gate valve 10. Use of one or more throttling positions that partially uncover at least one of the multiple openings 24 may provide intermediate throttling capabilities (e.g., additional throttling options for a particular number of multiple openings 24), and may also be particularly useful to provide smaller throttling orifices and corresponding higher throttling effects on the flow of fluid under certain conditions (e.g., starting up a well). Further, in combination with certain shapes of the multiple openings 24, the use of one or more throttling positions that partially uncover at least one of the multiple openings 24 may provide additional options for intermediate throttling capabilities.

Additionally, at least one of the multiple openings 24 (e.g., the second opening 24) may be a full bore opening that, when aligned with the fluid bore 60, enables a full level of the flow of fluid (e.g., a full or substantially full level of the flow of fluid; the gate 20 does not restrict the flow of fluid through the fluid bore 60; a same size as the fluid bore 60 or respective center bores of annular seats 70) across the choke gate valve 10. In some embodiments, a largest one of the multiple openings 24 may be the full bore opening or may be a throttling orifice that is sized to limit the flow of the fluid to a desirable flow rate (e.g., a desirable maximum flow rate) to thereby protect equipment downstream of the choke gate valve 10, such as from conditions in a well (e.g., undesirable conditions, such as excessive pressure and/or flow). Accordingly, the choke gate valve 10 may be part of an installation flow restriction system.

The choke gate valve 10 may provide a closed position or configuration in which the gate 20 shuts off the flow of fluid across the choke gate valve 10. For example, a portion of the gate 20 may be a solid portion that is configured to seal against the housing 18 (e.g., against the annular seats 70 of the housing 18) to shut off the flow of fluid across the choke gate valve 10. Indeed, an initial position of the choke gate valve 10 (e.g., starting up a well) may include the closed position or configuration. Further, the choke gate valve 10 may be configured to adjust the gate 20 to the closed position or configuration to enable the choke gate valve 10 to operate as a shutdown valve (e.g., emergency shutdown valve [ESV]; in response to conditions of the flow of fluid/well conditions).

To facilitate use of the choke gate valve 10 in this manner, the gate 20 may be formed of a ductile metal material to block or prevent collapse of the gate 20 (e.g., due to brittle failure). Indeed, the gate 20 may be formed of the ductile metal material that retains a hard liner or removable insert (e.g., along the multiple openings 24) to thereby block or prevent the hard liner or removable insert from dislodging or otherwise failing (e.g., dislodging and traveling downstream; due to brittle failure). However, in some embodiments, the choke gate valve 10 may not provide any closed position or configuration.

In any case, an operator and/or a controller 80 (e.g., based on sensor data and/or target production rates) may select and/or determine an appropriate position for the gate 20 to fully or partially align at least one of the multiple openings 24 with the fluid bore 60 (e.g., to throttle the flow of fluid), and then may instruct and/or control the actuator 64 to move the gate 20 to the appropriate position. As shown, the controller 80 includes a processor 82 and a memory 84. The processor 82 may be processing circuitry that includes one or more processors configured to execute software, such as software for processing signals (e.g., from one or more sensors, such as flow rate sensors upstream and/or downstream of the gate 20) and/or controlling components of the choke gate valve 10 (e.g., the actuator 64). The memory 84 may include one or more memory devices (e.g., a volatile memory, such as random access memory [RAM], and/or a nonvolatile memory, such as read-only memory [ROM]) that may store a variety of information and may be used for various purposes. For example, the memory 84 may store processor-executable instructions (e.g., firmware or software) for the processor 82 to execute, such as instructions for processing the signals and/or controlling the components of choke gate valve 10. It should be appreciated that the controller 80 may include various other components, such as a communication device (e.g., wireless transceiver) that is capable of communicating data and/or other information to various other devices (e.g., a remote desktop computer or server, the Internet, a cloud system).

It should be appreciated that the controller 80 may be a dedicated and/or contained controller with processing circuitry that carries out the various techniques disclosed herein. However, the controller 80 may be part of and/or include a distributed controller (e.g., remote computing system and/or cloud computing system) with processing circuitry that carries out the various techniques disclosed herein. Thus, while certain operations are described as being performed by the controller 80 to facilitate discussion, it should be appreciated that the various techniques disclosed herein may be performed by any suitable device and/or distributed between any suitable combination of devices (e.g., the processor 82 of the controller 80, processing circuitry of the remote computing system, and/or processing circuitry of the cloud computing system). Additionally, the controller 80 may include an output device, such as a display that is configured to display an indication of a current position of the gate 20 and/or other information (e.g., flow rate upstream and/or downstream of the gate 20).

In operation, the controller 80 may receive an indication of a target position of the gate 20 to align a particular opening of the multiple openings 24 with the fluid bore 60. For example, the controller 80 may receive a user input (e.g., via physical or virtual keys, such as virtual keys presented on the display that operates as a touchscreen display) that specifies the particular opening of the multiple openings. As another example, the controller 80 may receive a user input that specifies a desired flow rate downstream of the gate 20, the controller 80 may receive sensor data that indicates the flow rate upstream of the gate 20, and then the controller 80 may determine the particular opening of the multiple openings 24 to provide the desired flow rate downstream of the gate 20. As another example, the controller 80 may determine a desired flow rate downstream of the gate 20 based on various factors (e.g., specifications of components or operations), the controller 80 may receive sensor data that indicates the flow rate upstream of the gate 20, and then the controller 80 may determine the particular opening of the multiple openings 24 to provide the desired flow rate downstream of the gate 20. In certain embodiments, the controller 80 may receive sensor data that indicates the flow rate downstream of the gate 20 to confirm that the flow rate downstream of the gate 20 corresponds to the desired flow rate downstream of the gate 20.

In some cases, the controller 80 may determine wear on the particular opening of the multiple openings 24 based on a mismatch between the flow rate downstream of the gate 20 and an expected flow rate that is expected to be provided with the particular opening aligned with the fluid bore 60. In such cases, the controller 80 may provide an alert (e.g., via the display) to notify the operator of potential wear on the gate 20 and/or may adjust the gate 20 to align another opening of the multiple openings 24 with the fluid bore 60. For example, as described herein at least two of the openings of the multiple openings 24 may have a same size and shape (e.g., at least at manufacturing and installation; prior to use to throttle fluid flow across the choke gate valve 10), and thus the controller 80 may align the another opening of the multiple openings 24 that matches (e.g., has the same size and shape) as the particular opening of the multiple openings 24 with the fluid bore 60 (e.g., to provide the desired flow rate downstream of the gate 20). In this way, the gate 20 may enable the choke gate valve 10 to provide appropriate fluid flow via the another opening the multiple openings 24, rather than replacing the gate 20 or carrying out other operations.

It should be appreciate that to move the gate 20 to align a particular opening, or a portion thereof, or a combination of two or more of the multiple openings 24 with the fluid bore 60, the controller 80 may reference or utilize programmed settings for the gate 20. For example, the controller 80 may reference or utilize programmed settings that link a first position of the gate 20 within the housing 18 with the particular opening of the multiple openings 24, a second position of the gate 20 within the housing 18 with the another opening of the multiple openings 24, and so on.

As shown, the annular seats 70 are annular structures that are supported in the housing 18, and the gate 20 is positioned to move between the annular seats 70 (e.g., relative to the axial axis 12). Thus, the annular seats 70 include an upstream seat (e.g., upstream of the gate 20 relative to the flow of fluid) and a downstream seat (e.g., downstream of the gate 20 relative to the flow of fluid). Generally, the gate 20 may seal against the upstream seat, the downstream seat, or both. The upstream seat and the downstream seat each include a respective center bore, which may include respective inner diameters that correspond to respective inner diameters of the fluid bore 60 defined by the housing 18 (e.g., so as not to restrict the flow of the fluid; to enable the full level of the flow of fluid when the full bore opening of the gate 20 is aligned with the fluid bore). In some embodiments, the upstream seat and the downstream seat each include the respective center bore that tapers relative to the axial axis 12. For example, as shown, the upstream seat includes the respective center bore that tapers relative to the axial axis 12 such that a respective upstream end is larger than a respective downstream end (e.g., in size, such as in diameter or cross-sectional area). Further, as shown, the downstream seat includes the respective center bore that tapers relative to the axial axis 12 such that a respective upstream end is smaller than a respective downstream end (e.g., in size, such as in diameter or cross-sectional area).

At least a portion of the respective center bore of the upstream seat and/or at least a portion of the respective center bore of the downstream seat may be formed from or include a liner (e.g., tungsten carbide; ceramic; diamond) to provide wear-resistant surfaces. Further, mating surfaces between the gate 20 and the upstream seat and/or the downstream seat may be formed from or include a liner (e.g., tungsten carbide; ceramic; diamond) to provide wear-resistant surfaces). Indeed, any surface may be formed from or include a liner (e.g., tungsten carbide; ceramic; diamond) to provide wear-resistant surfaces), such as any surface in a throttling region of the choke gate valve, any surface of the housing 18 along the fluid bore, any surface of the annular seats 70, any surface of an outlet section 72, any mating surface, and so forth. The upstream seat, the downstream seat, and/or the outlet section 72 may be formed of a ductile metal material to block or prevent collapse or damage (e.g., due to brittle failure).

In some embodiments, the outlet section 72 may also include a respective center bore, which may taper relative to the axial axis 12. For example, as shown, the outlet section 72 the respective center bore that tapers relative to the axial axis 12 such that a respective upstream end is smaller than a respective downstream end (e.g., in size, such as in diameter or cross-sectional area). Thus, the downstream seat and/or the outlet section 72 may operate as outlet venturis to block erosion downstream of the multiple openings 24. Further, as shown, an inlet (e.g., of the choke gate valve 10 and/or the upstream seat) is larger than an outlet (e.g., of the multiple openings 24) to provide throttling at the outlet. It should be appreciated that the annular seats 70, the inlet, the outlet, and the gate 20 enable the choke gate valve 10 to operate as a bi-directional valve to throttle the flow of fluid in either direction through the choke gate valve 10 (e.g., in a first direction of the arrow 62 and in a second direction opposite of the arrow 62). An ability to operate as the bi-directional valve may be particularly useful in certain contexts, such as in injection systems and/or carbon capture systems (e.g., injecting carbon dioxide into old wells). For example, the bi-directional valve may enable injection of a substance (e.g., carbon dioxide) and also removal of the substance (e.g., stored carbon dioxide) at a later time, such as for use in other processes or systems.

It should be appreciated that the flow of fluid passing through an inlet of the choke gate valve 10 may be at relatively high pressures, e.g., pressures greater than about 3.5 Megapascal (MPa) or 500 pounds per square inch (psi), 7 MPa or 1000 psi, 34 MPa or 5000 psi, 70 MPa or 10,000 psi, 100 MPa or 15,000 psi, 138 MPa or 20,000 psi, 172 MPa or 25,000 psi, or 206 MPa or 30,000 psi and may be carrying significant amounts of abrasive material (e.g., sand, ceramic, rock). For example, the flow of fluid may carry significant amounts of sand from flow back after fracing a well. Without the present embodiments, this abrasive material may rapidly wear a typical choke valve and degrade its ability to control the flow of fluid from the well.

Figure 4:
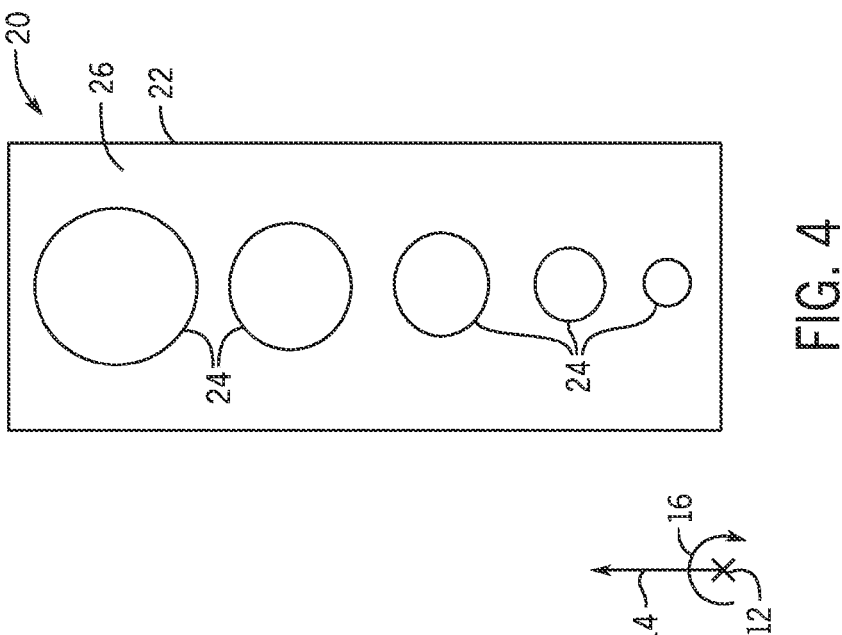
FIG. 4 is a front view of a gate that may be used in the choke gate valve of FIG. 1, wherein the gate includes multiple orifices of different sizes, in accordance with an embodiment of the present disclosure.

FIG. 4 is a front view of an embodiment of a portion of the gate 20 that may be used in the choke gate valve 10 of FIG. 1, wherein the gate 20 includes the multiple openings 24 of different sizes. As shown, the multiple openings 24 are through holes that extend axially from the first face 26 to the second face of the gate body 22. As shown, the multiple openings 24 vary in size (e.g., inner diameter; cross-sectional area taken in a plane perpendicular to the axial axis 12). For example, the first opening 24 proximate to the first end of the gate body 22 may have the first size, and the second opening 24 proximate to the second end of the gate body 22 may have the second size that is different (e.g., greater) than the first size.

The multiple openings 24 may include an array of discrete openings with any suitable arrangement or configuration. As shown, the multiple openings 24 incrementally increase in size from the first end of the gate body 22 to the second end of the gate body 22. Alternatively, the multiple openings 24 may incrementally decrease in size from the first end of the gate body 22 to the second end of the gate body 22. As shown, each of the multiple openings 24 is a unique or different size (no two openings have a same size). Alternatively, each of the multiple openings 24 may be the same size, or some of the multiple openings 24 may be the same size.

As shown, the multiple openings 24 have the same shape (e.g., cross-sectional shape taken in a plane perpendicular to the axial axis 12; circle shape). Alternatively, each of the multiple openings 24 may have a different shape, or some of the multiple openings 24 may have a different shape (e.g., cross-sectional shape taken in a plane perpendicular to the axial axis 12; circle shape, semi-circle shape, oval shape, tear-drop shape, triangle shape, irregular shape, square shape, crescent shape). Further, the gate 20 may include any number of multiple openings 24, such as 2, 3, 4, 5, 6, 7, 8, or more.

Figure 5:
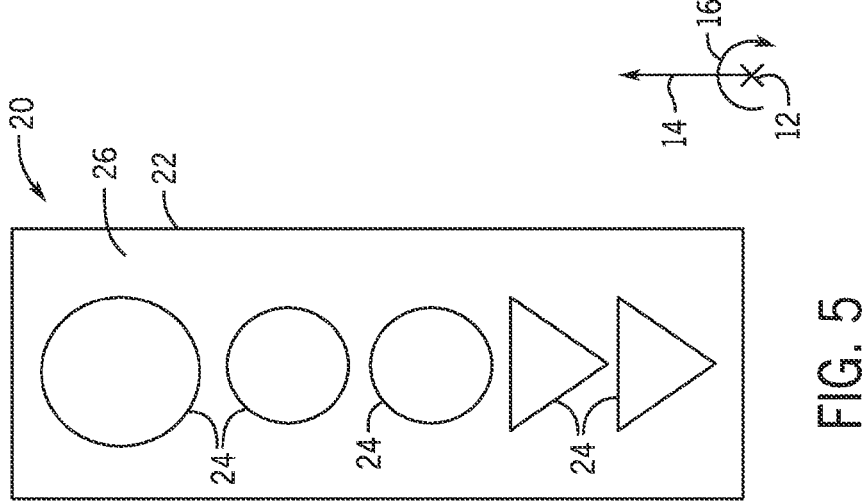
FIG. 5 is a front view of a gate that may be used in the choke gate valve of FIG. 1, wherein the gate includes multiple orifices of different sizes and different shapes, in accordance with an embodiment of the present disclosure.

FIG. 5 is a front view of an embodiment of a portion of the gate 20 that may be used in the choke gate valve 10 of FIG. 1, wherein the gate 20 includes the multiple openings 24 of different sizes and different shapes. As shown, the multiple openings 24 are through holes that extend axially from the first face 26 to the second face 28 of the gate body 22. As shown, the multiple openings 24 vary in size (e.g., inner diameter; cross-sectional area taken in a plane perpendicular to the axial axis 12). For example, the first opening 24 proximate to the first end 34 of the gate body 22 may have the first size, and the second opening 24 proximate to the second end 36 of the gate body 22 may have the second size that is different (e.g., greater) than the first size.

The multiple openings 24 may include an array of discrete openings with any suitable arrangement or configuration. As shown, some of the multiple openings 24 have the same size and the same shape. For example, two of the multiple openings 24 are triangle shapes of the same size, and two of the multiple openings 24 are circle shapes of the same size. Thus, if one of the multiple openings 24 that has a desirable size for throttling the flow of fluid (e.g., to provide a target production rate) experiences wear after a long duration of use for throttling the flow of fluid (e.g., over months or years), the gate 20 may be adjusted to utilize one of the other multiple openings 24 of the desirable size for throttling the flow of fluid. Accordingly, in such cases, the choke gate valve 10 may continue to be used with the one of the other multiple openings 24 of the desirable size for throttling the flow of fluid without performing maintenance operations to replace the gate 20.

Additionally, the multiple openings 24 also generally increase in size from the first end of the gate body 22 to the second end of the gate body 22 (e.g., the triangle shape proximate to the first end has a smaller size than the circle shape proximate to the second end). Alternatively, the multiple openings 24 may generally decrease in size from the first end of the gate body 22 to the second end of the gate body 22. Alternatively, as discussed herein, each of the multiple openings 24 may be a unique or different size (no two openings have a same size). Additionally, as discussed herein, the multiple openings 24 may have different shapes or the same shape (e.g., cross-sectional shape taken in a plane perpendicular to the axial axis 12; circle shape, semi-circle shape, oval shape, tear-drop shape, triangle shape, irregular shape, square shape, crescent shape), such as no repeating shapes or all the same shape. Further, the gate 20 may include any number of multiple openings 24, such as 2, 3, 4, 5, 6, 7, 8, or more.

As discussed herein, use of one or more throttling positions that partially uncover at least one of the multiple openings 24 may provide intermediate throttling capabilities. For example, it may be desirable to partially uncover the first opening that has the triangle shape to provide a relatively small throttling orifice and corresponding higher throttling effects on the flow of fluid under certain conditions (e.g., starting up a well), and then to fully uncover the first opening that has the triangle shape (or any other suitable opening) under other conditions (e.g., upon reaching a stable pressure; during long-term production operations).

In highly erosive environments with very high pressure drops, two or more choke gate choke valves 10 may be placed in series to throttle to pressure in stages, thus splitting the pressure drop and/or reducing the erosion on individual choke gate valves 10. In such cases, the choke gate valves 10 may have different or a same configuration (e.g., different gates 20 with different configurations of the multiple openings 24 or the same gates 20 with the same configurations of the multiple openings 24). In some such cases, the choke gate valves 10 may be set to utilize different sizes and/or shapes of the multiple openings 24 to provide variation in total throttle effect (e.g., total throttle area across the two or more choke gate valves 10).

The choke gate valve 10 described herein may provide selectable, adjustable control of the flow of fluid through the choke gate valve 10. The choke gate valve 10 may be utilized in any of a variety of applications and industries, such as oil and gas systems, storage facilities, manufacturing facilities, refineries, water treatment facilities, industrial plants, and the like. The choke gate valve 10 may be particularly well-suited for use with high pressure fluids, such as high-pressure oil and gas wells. Often, such wells have high fluid velocity which, combined with entrained solids, may cause erosion of typical choke valves. Further, it may be desirable to operate such wells with high throttle levels provided by relatively small openings, which may be unsuitable for or difficult to reliably achieve with typical choke valves. The choke gate valve 10 described herein provides a configuration that is both erosion resistant and enables adjustment to the throttle level via movement of the gate 20 within the housing 18 of the choke gate valve 10 (e.g., rather than disassembly of the choke gate valve 10 or removal of the gate 20 from the housing 18 of the choke gate valve 10). Thus, an operator and/or a controller may readily select a throttle position to uncover all or a portion of at least one opening of multiple openings 24 of the gate 20 to readily adjust the throttle level to respond to various conditions of the well.

While the subject disclosure is described through various embodiments, it will be understood by those of ordinary skill in the art that modification to and variation of the described and illustrated embodiments may be made without departing from the inventive concepts herein disclosed. Moreover, while some embodiments are described in connection with various illustrative structures, one skilled in the art will recognize that the system may be embodied using a variety of specific structures.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S. C. 112(f). However, for any claims containing elements designated in any other manner, it is intended that such elements are not to be interpreted under 35 U.S. C. 112(f).

The invention claimed is:

1. A choke gate valve, comprising:
   a housing that defines a fluid bore; and
   a gate comprising a plurality of throttling orifices, wherein the gate is configured to move within the housing between a first throttle position in which the gate extends across the fluid bore to position a first throttling orifice of the plurality of throttling orifices in the fluid bore to throttle a fluid flow through the fluid bore and a second throttle position in which the gate extends across the fluid bore to position a second throttling orifice of the plurality of throttling orifices in the fluid bore to throttle the fluid flow through the fluid bore, wherein the gate comprises a full bore orifice that comprises an inner diameter that corresponds to respective inner diameters of the fluid bore, and wherein the gate is configured to move within the housing to align the full bore orifice with the fluid bore to enable a full flow of the fluid flow.

2. The choke gate valve of claim 1, wherein the first throttling orifice and the second throttling orifice comprise different sizes.

3. The choke gate valve of claim 1, wherein the first throttling orifice and the second throttling orifice comprise different shapes.

4. The choke gate valve of claim 1, wherein the gate comprises a solid portion, and the gate is configured to move within the housing to a closed position in which the solid portion of the gate extends across the fluid bore to shut off the fluid flow through the fluid bore.

5. The choke gate valve of claim 1, wherein each of the plurality of throttling orifices is configured to operate as a positive bean when exposed to the fluid flow in the fluid bore.

6. The choke gate valve of claim 1, wherein the gate is configured to move within the housing to an additional throttle position in which the gate extends across the fluid bore to cover a portion of the first throttling orifice of the plurality of throttling orifices with annular seats to thereby expose only a remaining portion of the first throttling orifice to the fluid bore to throttle the fluid flow through the fluid bore such that the choke gate valve operates as a variable orifice device.

7. The choke gate valve of claim 1, wherein the first throttling orifice and the second throttling orifice are arranged to enable the fluid flow to continue during a transition from the first throttle position to the second throttle position.

8. The choke gate valve of claim 1, wherein the choke gate valve is a bi-directional choke gate valve that is configured to throttle the fluid flow in either direction through the fluid bore.

9. The choke gate valve of claim 1, wherein the gate comprises a ductile metal material.

10. The choke gate valve of claim 9, wherein the gate is configured to move within the housing to a closed position to operate as a shutdown valve in response to conditions of the fluid flow.

11. The choke gate valve of claim 1, wherein the plurality of throttling orifices comprise tungsten carbides, ceramics, industrial diamond, or any combination thereof.

12. The choke gate valve of claim 1, comprising an upstream annular seat and a downstream annular seat, wherein the upstream annular seat, the downstream annular seat, or both comprise tungsten carbides, ceramics, industrial diamond, or any combination thereof.

13. The choke gate valve of claim 1, comprising annular seats, wherein mating surfaces of the gate and the annular seats comprise tungsten carbides, ceramics, industrial diamond, or any combination thereof.

14. A choke gate valve system, comprising:
   a housing that defines a fluid bore;
   a gate comprising a plurality of throttling orifices, wherein the gate is configured to move within the housing between a first throttle position in which the gate extends across the fluid bore to position a first throttling orifice of the plurality of throttling orifices in the fluid bore to throttle a fluid flow through the fluid bore and a second throttle position in which the gate extends across the fluid bore to position a second throttling orifice of the plurality of throttling orifices in the fluid bore to throttle the fluid flow through the fluid bore, wherein the gate comprises a full bore orifice that comprises an inner diameter that corresponds to respective inner diameters of the fluid bore, and wherein the gate is configured to move within the housing to align the full bore orifice with the fluid bore to enable a full flow of the fluid flow; and an actuator configured to drive the gate to move within the housing to selectively align one or more throttling orifices of the plurality of throttling orifices with the fluid bore.

15. The choke gate valve system of claim 14, comprising a controller configured to instruct the actuator to drive the gate to move within the housing based on a user input, sensor data, or both.

16. The choke gate valve system of claim 14, wherein the plurality of throttling orifices comprises the first throttling orifice with a first size and the second throttling orifice with a second size that is different than the first size.

17. The choke gate valve system of claim 16, wherein the plurality of throttling orifices comprises a third throttling orifice with a third size that is the same as the first size.

18. The choke gate valve system of claim 14, wherein the plurality of throttling orifices comprises the first throttling orifice with a first shape and the second throttling orifice with a second shape that is different than the first shape.

* * * * *